July 15, 1941.  C. D. PETERSON ET AL  2,249,035
POWER AND TRANSMISSION UNIT
Filed June 6, 1939   3 Sheets-Sheet 1

INVENTORS:
Carl D. Peterson &
Elmer J. Barth,
BY Bodell & Thompson
ATTORNEYS.

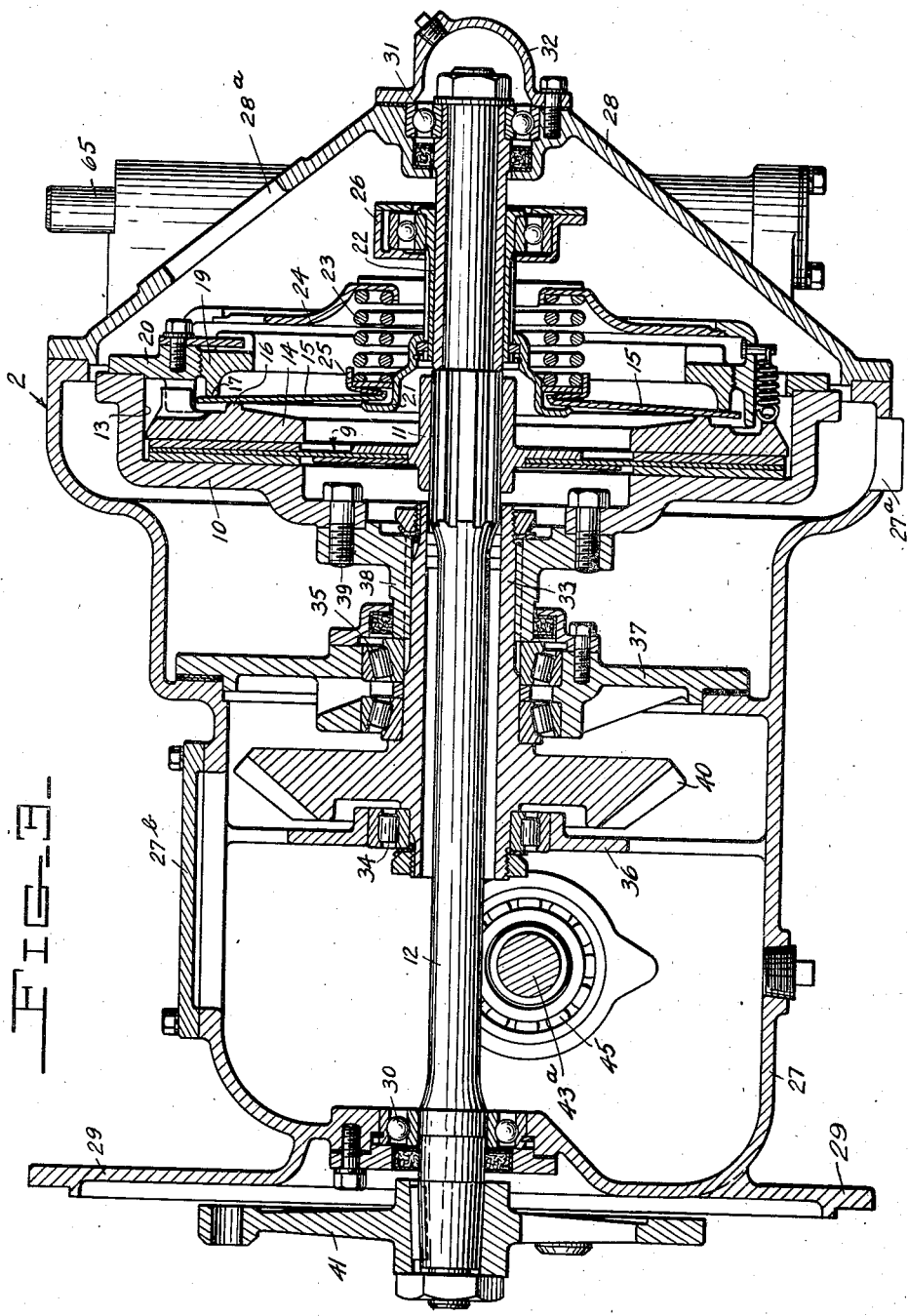

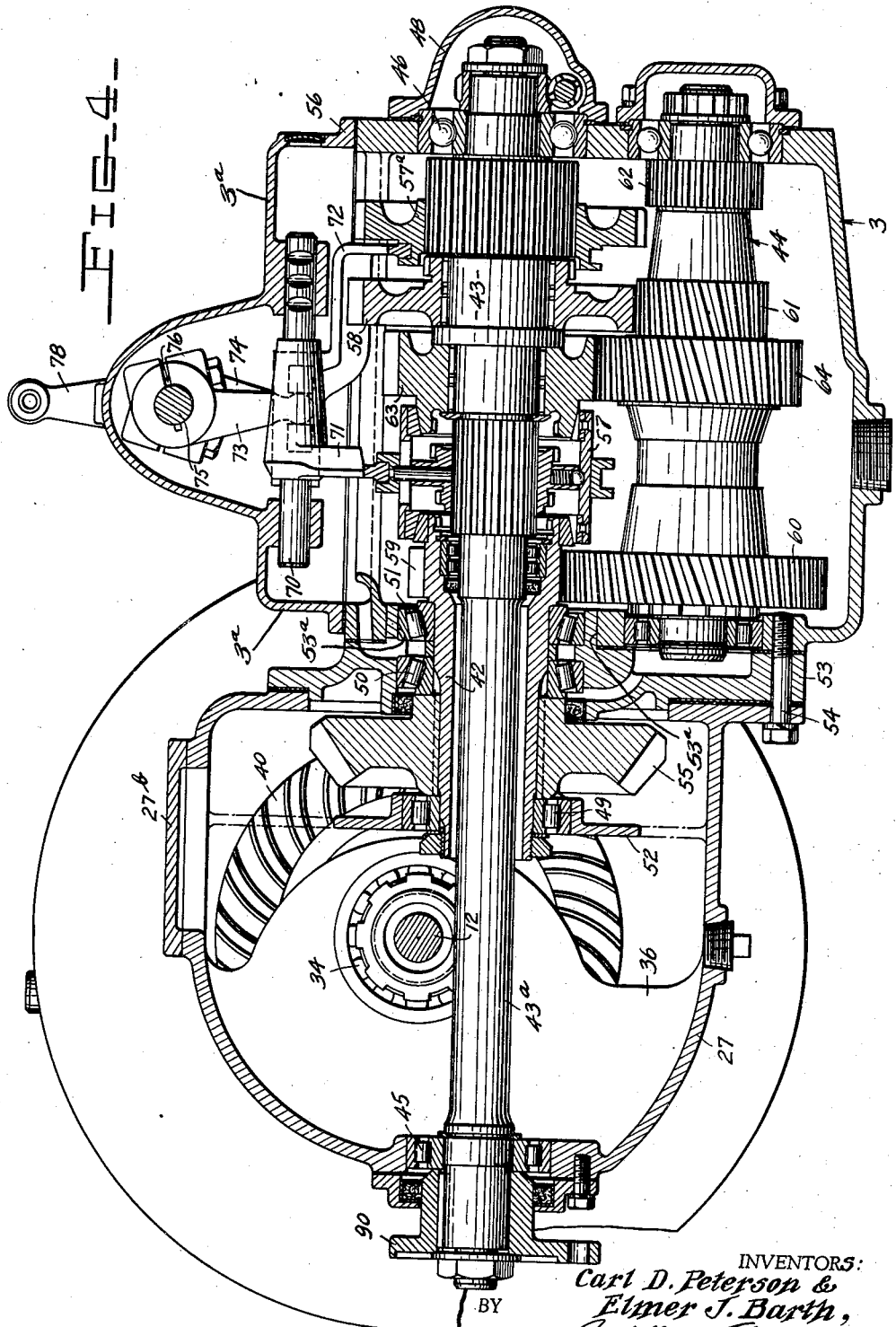

Patented July 15, 1941

2,249,035

UNITED STATES PATENT OFFICE 2,249,035

POWER AND TRANSMISSION UNIT

Carl D. Peterson and Elmer J. Barth, Toledo, Ohio

Application June 6, 1939, Serial No. 277,681

3 Claims. (Cl. 180—54)

This invention relates to power transmission units including an engine, clutch, and change-speed transmission gearing, and has for its object a unit in which the transmission gearing is interposed between the engine and the clutch with its output shaft extending transversely of the axial line of the clutch and engine shafts and the clutch at the rear end of the unit, where it can be readily cooled, the transmission being so mounted as to be readily accessible without demounting and readily assembled in the unit.

It further has for its object a power transmission unit which may be assembled transversely of a vehicle parallel and close to the driving axle, as the rear axle, and the speed changes transmitted to the driving axle through a propeller shaft extending coaxially or in the same general direction as the output shaft of the gearing and at a right angle to the output shaft, and hence the unit assembled within a vehicle of a given width and with a minimum distance between the unit and the driving axle without a propeller shaft extending in the general direction lengthwise of the axle and of the unit.

It further has for its object a compact arrangement of the engine clutch and transmission in which the clutch is driven by a comparatively long intermediate shaft between it and the engine and the motion is transmitted from the transmission gearing through a comparatively long output shaft or extension thereof extending crosswise of the intermediate shaft.

It also has for its object a clutch construction in which one of the members, as the driven member, is carried by a hollow shaft or sleeve rotatable about the engine-actuated or intermediate shaft, and drives the input shaft of the gearing, which is also a hollow shaft or sleeve around the output shaft of the gearing or the extension thereof, through intermeshing hypoid or skew gears on the hollow shafts, all whereby a unit of maximum uniform length consisting of the engine, clutch and transmission gearing can be arranged in the available width of the vehicle parallel and close to the driving axle.

The invention consists in the novel features and in the combinations and constructions hereinafter set forth and claimed.

In describing this invention, reference is had to the accompanying drawings in which like characters designate corresponding parts in all the views.

Figure 3 is an enlarged sectional view on line 3—3, Figure 1.

Figure 4 is an enlarged sectional view on line 4—4, Figure 2.

Figure 1:
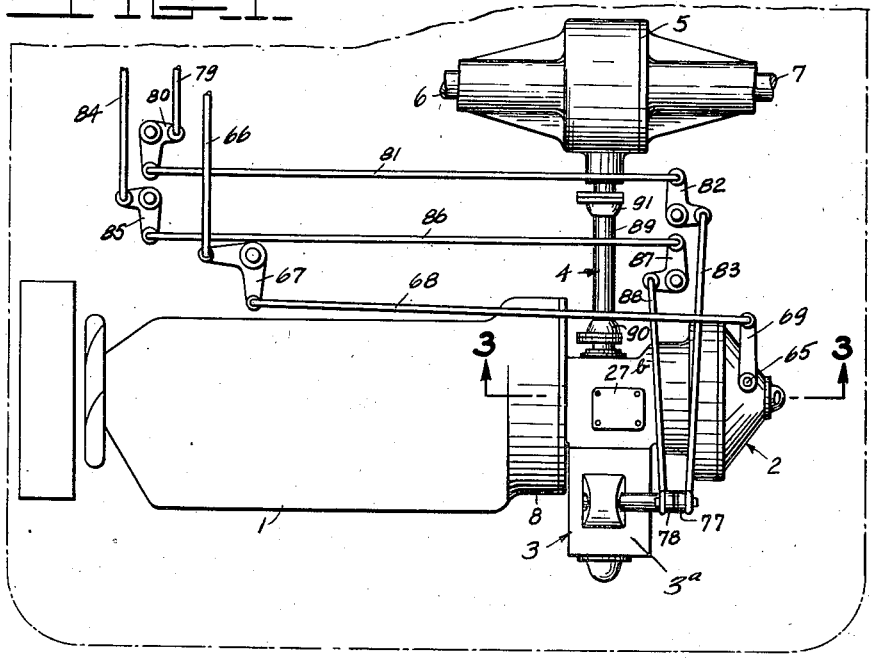
Figure 1 is a plan view of this power and transmission unit, the outlines of the body of the vehicle or bus being indicated in dot-and-dash lines and the contiguous portion of the driving axle, the clutch control and the gear shifting mechanism being also shown.
Figure 2:
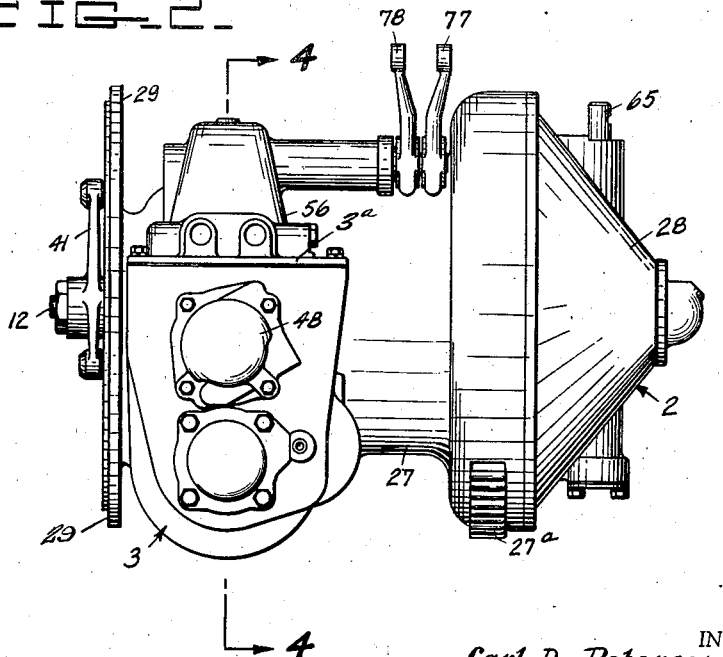
Figure 2 is a side elevation of the transmission gear and clutch assembly.

The power and transmission unit comprises an engine 1, a clutch 2, and change-speed transmission gear 3, the clutch 2 being spaced apart from the engine and transmission gear 3 being interposed between the clutch and the engine with its output shaft extending transversely of the axial line of the engine shaft and the clutch from one side of the unit to the other side, where it is connected by a propeller shaft 4 to the pinion gear of the differential gear of any well-known construction located within the housing 5.

6 and 7 designate the drive shaft sections which are driven through the differential gearing in the usual manner.

The engine is formed with the usual fly wheel housing 8 or what, for brevity's sake, is called the fly wheel housing herein, although there may or may not be a fly wheel on the crank shaft of the engine within the housing 8.

The clutch includes driving and driven members, one of which is shiftable axially, and in this embodiment of the invention, the driving member is shiftable axially into and out of engaged position. The clutch here shown is of the single plate pressure ring type. 9 designates the driving member and 10 the driven member, the driving member 9 being here shown as a disk having a hub 11 splined on an intermediate shaft 12 which rotates with or is coupled to the engine shaft. The driven member 10 is formed with a recess 13, and the disk 9 with the friction faces on opposite sides thereof, extends between the bottom of the recess and a pressure ring 14. The pressure ring is suitably interlocked with the driven member 10 to rotate therewith and is shiftable axially. The pressure ring is operated in any suitable manner to shift the disk 9 into engaged position and permit it to release from engaged position. It is here shown as operated through radial levers 15 coacting at 16 and 17 with fulcrums on the pressure ring and on an adjustable ring 19 threading into the back plate 20 on the driven member 10. The inner ends of the levers coact with an annular head or abutment 21 on a throw-out sleeve 22 around the rear end of the intermediate shaft 12. The clutch spring 23 is interposed between an abutment 24 on the back plate and the inner ends of the levers 15, the spring thrusting against suitable abutments or washers 25 interposed between the spring and the inner ends of the levers 15. 26 is the throw-out collar on the throw-out sleeve 22.

The construction of the clutch per se forms no part of this invention.

27 and 28 designate the sections of the clutch housing, the section 27 being an intermediate section between the clutch and the engine housing and having a plate 29 at its front end for securement to the fly wheel housing 8 in the same manner that the usual bell housing is secured to the fly wheel housing. The section 28 is detachably secured to the rear end of the section 27 and is in the form of the usual bell housing. It is provided with a ventilating opening 28ᵃ. The section 27 is provided with a similar opening 27ᵃ for cooling the clutch. The opening 27ᵃ is preferably in communication with the interior of the vehicle to draw in comparatively clean air.

The intermediate shaft 12 is journalled in suitable anti-friction bearings at 30 and 31 in the front end of the section 27 of the clutch housing adjacent the engine or fly wheel housing and in the rear end of the bell housing section 28, the bearing 31 being enclosed in a suitable cap 32.

The driven member 10 of the clutch is mounted on a hollow shaft or sleeve 33 encircling the intermediate shaft 12 and journalled at 34 and 35 in bearings provided respectively in partitions or webs 36, 37 in the section 27 of the clutch housing, the web or partition 37 being demountable. The hollow shaft or sleeve 33 is coupled to the driven member 10 of the clutch by a hub 38 splined on the hollow shaft 33 and secured, as by screws 39, to the driven member 10. The sleeve 33 has a gear 40 thereon here shown as formed integral therewith, this gear being located between the bearings 34 and 35. The intermediate shaft 12 is coupled to the engine shaft in axial alinement therewith through any suitable coupling means, one section of which is shown at 41.

The transmission gearing may be of any general type, and includes an input shaft 42, an output shaft 43 in line with the input shaft, a countershaft 44, and trains of gears between the same to effect final drive through different gear ratios. The output shaft 43 is provided with an extension 43ᵃ extending transversely of the section 27 of the clutch housing and transversely of the intermediate shaft 12 and is spaced in a radial direction therefrom. It is journalled at its opposite ends respectively in bearings 45 and 46 in the wall of the housing section 27 opposite to that on which the transmission gearing is located, and in the outer end wall of the gear box 3, the bearing 46 being enclosed by a suitable cap 48. The input shaft 42 is a sleeve concentric with the extension 43ᵃ of the output shaft and concentrically spaced therefrom and journalled in suitable bearings 49, 50 and 51. The bearings 49 are mounted in a bracket or web 52 in the section 27 of the clutch housing, and the bearings 50, 51 are mounted in an intermediate carrier or adapter 53 interposed between the gear box and the section 27 of the clutch housing and pivoted at 53ᵃ in the front wall 47 of the gear box. The gear box and the intermediate carrier are secured to the section 27 of the clutch housing, as by screws 54. The bearings 50 and 51 also act as end-thrust bearings. By this arrangement, a conventional gear box is readily adapted for a gearing with the hollow or sleeve input shaft in place of the usual stem gear, and the gear box assembly applied to the side of the intermediate section of the clutch housing. The input shaft 42 has a gear 55 thereon meshing with the gear 40, and as the shafts 12 and 43ᵃ are spaced apart in a radial direction, and hence the axes of these shafts in different planes, the gears 40 and 55 are hypoid or skew gears. By reason of the location of the gear box, a standard gear box may be readily assembled with the engine and the clutch, between the engine and the clutch, and is accessible as it can be readily removed and replaced, without demounting the clutch. The gear box is provided with a removable cover 3ᵃ, and hence the interior thereof is readily accessible. The section 27 of the clutch housing is also provided with a demountable cover 27ᵇ for giving access to the gears 40 and 55. The gearing includes shiftable elements for effecting a drive through different gear ratios, one of these shiftable elements being here shown as a synchronizing clutch 57, and the other as a shiftable gear 57ᵃ, and these may be selected and shifted through any suitable shifting and selecting mechanism.

Shifting of the gear 57ᵃ to the left from neutral, clutches it to a gear 58 normally rotatable about the output shaft 43, and hence clutches the gear 58 to the output shaft 43, so that first speed forward is obtained as follows: Gear 59 on the input shaft 42, gear 60 meshing therewith on the countershaft 44, gear 61 on the countershaft which meshes with the gear 58. Shifting of the gear 57ᵃ to the right from neutral shifts it into mesh with an idler, not shown, which meshes with a gear 62 rotatable with the countershaft to produce reverse speed through gears 59, 60, countershaft 44 and gear 62, the idler, not shown, and gear 57ᵃ. Shifting of the synchronizing clutch to the right from neutral clutches gear 63 to the output shaft 43 effecting second speed forward through gears 59, 60, countershaft 44, gear 64 on the countershaft which meshes with the gear 63. Shifting of the synchronizing clutch 57 to the left from neutral connects the input shaft 42 and the output shaft 43 together in direct drive relation. The extension 43ᵃ of the output shaft 43 and also the intermediate shaft are comparatively long, and hence a flexible drive or wind-up is provided in starting or upon sudden acceleration, and in order to facilitate this action, these shafts are reduced to a diameter to accomplish this result, the shaft 12 being reduced between its front driving end and the point where the driven element of the clutch is splined thereon, the extension 43ᵃ of the output shaft of the gearing being reduced in diameter between its output end and the synchronizing clutch 57 or where this clutch is splined to the output shaft 43. The crosswise arrangement of the shaft extension 43ᵃ and the shaft 12 permit long shafts to be used in the confined available space.

The clutch is operated through a suitable throw-out mechanism including the throw-out sleeve 22 and the throw-out collar 26, a throw-out yoke, not shown, but mounted upon a yoke shaft 65 journalled in the bell housing section 28 of the clutch housing, this being operated from a remotely controlled lever, as a pedal, located in the front of the vehicle. As here illustrated, the yoke shaft 65 is operated through a link 66, a bell crank lever 67 to one arm of which the link 66 is pivoted and link 68 connected at one end to the other arm of the bell crank lever 67 and at its other end to a rock arm 69 on the yoke shaft 65. The other end of the link 66 is connected to the clutch pedal in any well-known manner. The shiftable elements of the transmission gearing are operated by any suitable mechanism, that here shown, including shift rods, as 70, one for the synchronizing clutch 57 and another for the shiftable gear 57a, forks 71 and 72 coacting respectively with the clutch 57 and the gear 57a and slidable with the rods 70 respectively, rock arms 73 and 74 mounted respectively on concentric shafts 75 and 76 and having rock arms 77 and 78 thereon and remote control mechanism for actuating the rock arms. The shift rods 70 and the shafts 75 and 76 and rock arms 73, 74 are suitably mounted in the cover 3a of the gear box, with the rock arms 77 and 78 located outside of the gear box. One of these rock arms, as 77, is operated through a link 79 connected at one end to the arm 80 of a bell crank lever, a link 81 connected at one end to the other arm of the bell crank lever and its other end to an arm 82 of another bell crank lever, the other arm of which is connected to the rock arm 77 by the link 83. The other rock arm 78 is shifted in a similar manner by a link 84, bell crank lever 85, link 86, another bell crank lever 87 and link 88. The links 79 and 84 extend forwardly to the front end of the vehicle where they coact with any well-known form of selecting and shifting lever or a lever having a lateral selecting movement and a fore-and-aft shifting movement.

The extension 43a of the output shaft 43 is connected to the pinion gear of the differential through a propeller shaft 4. The propeller shaft consists of telescoping sections 89, which are connected respectively to the shaft 43a and drive pinion shaft of the differential gear by universal joints 90, 91. The drive pinion shaft and differential gear are mounted in any well-known manner in the differential gear housing 5.

What we claim is:

1. In a transmission mechanism for automotive engines having a fly wheel housing, a clutch housing including a section in which the clutch is contained, and an intermediate boxlike section having a wall remote from the former section provided with means for securement to the fly wheel housing of the engine, a gear box for a change-speed gearing extending laterally from one side of the intermediate boxlike housing, a clutch drive shaft journalled at its opposite ends in one wall of the clutch housing and in the wall of the boxlike housing provided with said means, a clutch driven shaft extending into the intermediate boxlike housing, the transmission mechanism including input and output shafts, the output shaft extending transversely of the intermediate boxlike housing crosswise of the clutch drive shaft, and motion transmitting means in the boxlike housing between the clutch driven shaft and the input shaft of the gearing.

2. In a transmission mechanism for automotive engines having a fly wheel housing, a clutch housing including a section in which the clutch is contained and an intermediate boxlike section having a wall at one end remote from the former section for attachment to the fly wheel housing of an engine, a clutch drive shaft, a clutch driven shaft, the former being journalled at one end in said wall of the boxlike housing and at its other end in the end wall of the portion of the housing containing the clutch, and a gear box extending laterally from one side of the intermediate boxlike section, the gearing in the gear box including input and output shafts, the output shaft extending transversely of the boxlike section and crosswise of the clutch drive shaft and radially spaced therefrom and being mounted at its end remote from the gear box in a lateral wall of the intermediate boxlike section, and motion transmitting means in the boxlike section between the driven shaft of the clutch and the input shaft of the gearing.

3. In a transmission mechanism for automotive engines having a fly wheel housing, a clutch housing including a section in which the clutch is contained and an intermediate boxlike section having a wall at one end remote from the former section for attachment to the fly wheel housing of an engine, a clutch drive shaft, a clutch driven shaft, the former being journalled at one end in said wall of the boxlike housing and at its other end in the end wall of the portion of the housing containing the clutch, and a gear box extending laterally from one side of the intermediate boxlike section, the gearing in the gear box including input and output shafts, the output shaft extending transversely of the boxlike section and crosswise of the clutch drive shaft and radially spaced therefrom and being mounted at its end remote from the gear box in a lateral wall of the intermediate boxlike section, and motion transmitting means in the boxlike section between the driven shaft of the clutch and the input shaft of the gearing, the driven shaft of the clutch being hollow and mounted concentric with the clutch drive shaft and the input shaft of the gearing being hollow and mounted concentric with the output shaft of the gearing.

CARL D. PETERSON.
ELMER J. BARTH.